US012317234B1

(12) United States Patent
Katague et al.

(10) Patent No.: US 12,317,234 B1
(45) Date of Patent: May 27, 2025

(54) DYNAMIC FREQUENCY SELECTION (DFS) AVOIDANCE

(71) Applicant: Amazon Technologies, Inc., Seattle, WA (US)

(72) Inventors: Alexandra Calkins Katague, San Francisco, CA (US); Reid Andrew OBoyle, Howell, MI (US)

(73) Assignee: Amazon Technologies, Inc., Seattle, WA (US)

( * ) Notice: Subject to any disclaimer, the term of this patent is extended or adjusted under 35 U.S.C. 154(b) by 409 days.

(21) Appl. No.: 17/963,022

(22) Filed: Oct. 10, 2022

(51) Int. Cl.
*H04W 72/02* (2009.01)
*H04W 72/0453* (2023.01)
*H04W 72/563* (2023.01)
*H04W 84/12* (2009.01)

(52) U.S. Cl.
CPC ....... *H04W 72/02* (2013.01); *H04W 72/0453* (2013.01); *H04W 72/563* (2023.01); *H04W 84/12* (2013.01)

(58) Field of Classification Search
None
See application file for complete search history.

(56) References Cited

U.S. PATENT DOCUMENTS

2021/0160198 A1* 5/2021 Kulkarni ............... G06F 12/084
2022/0295500 A1* 9/2022 Gokturk .............. H04W 72/542
2023/0029256 A1* 1/2023 Huotari ................. H04L 5/0062

* cited by examiner

*Primary Examiner* — Robert M Morlan
(74) *Attorney, Agent, or Firm* — Lowenstein Sandler LLP

(57) ABSTRACT

Technologies directed to dynamic frequency selection (DFS) avoidance are described. One method stores a time-stamp and a first amount of time operating on a channel for each historical radar event detected in a wireless local area network. The method determines a first score using a first weighting factor based on the first amount of time and a second weighting factor based on a second amount of time since the respective historical radar event. The method determines a second score for a first DFS channel by summing the first score for each historical radar event that occurred on the first DFS channel. The method determines a third score for a second DFS channel by summing scores of events occurring on the second DFS channel. The method selects the first DFS channel based on at least the second score and the third score for sending second data to a second device.

20 Claims, 8 Drawing Sheets

302 308 300 306 310 312 314 304

DYNAMIC FREQUENCY SELECTION (DFS) AVOIDANCE

BACKGROUND

A large and growing population of users is enjoying entertainment through the consumption of digital media items, such as music, movies, images, electronic books, and so on. The users employ various electronic devices to consume such media items. Among these electronic devices (referred to herein as endpoint devices, user devices, clients, client devices, or user equipment) are electronic book readers, cellular telephones, personal digital assistants (PDAs), portable media players, tablet computers, netbooks, laptops, and the like. These electronic devices wirelessly communicate with a communications infrastructure to enable the consumption of the digital media items. In order to wirelessly communicate with other devices, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

DETAILED DESCRIPTION

Figure 1:
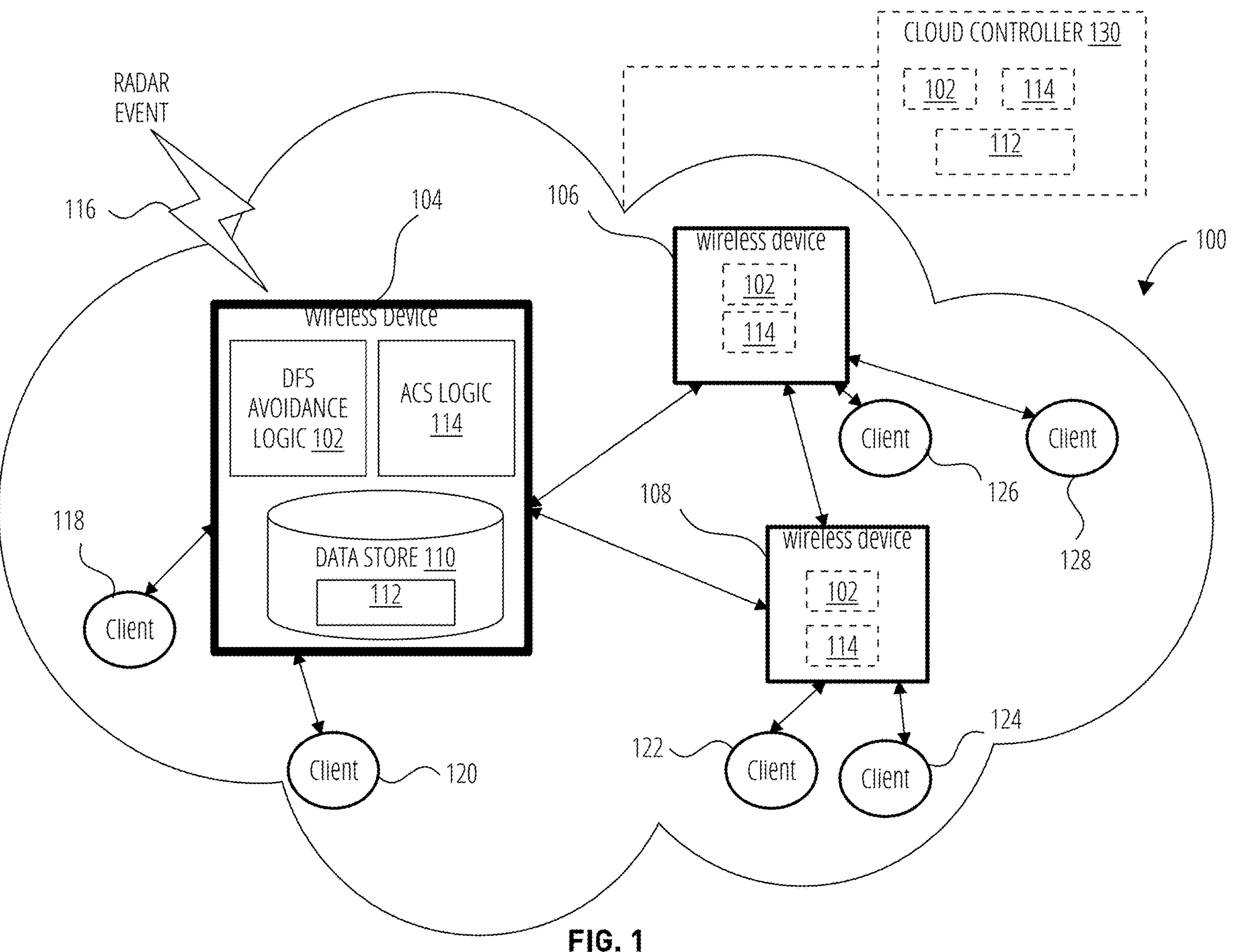
FIG. 1 is a network diagram of wireless devices in a wireless network with DFS avoidance logic for channel selection based on historical radar events stored locally in the WLAN, according to at least one embodiment.

Technologies directed to DFS avoidance are described. The 2.4 GHz and 5 GHz industrial, scientific, and medical (ISM) radio bands allow unlicensed wireless communications. Due to its unlicensed nature, many short-ranged, low-power wireless communication systems operate in these frequency bands. As such, there is a limited de-license spectrum in various locations (e.g., 2.4 GHz ISM and 5 GHz U-NII bands). Various devices are described herein that include WLAN radios that operate in the 2.4 GHz and 5 GHz U-NII-1 bands and utilize various WLAN protocols, such as the Wi-Fi® protocols (e.g., 802.11n, 802.11ac, or the like). The radios can utilize 2×2 spatial multiplexing MIMO and channel bandwidths from 20 MHz to 40 MHz. The radios can see all 5.x GHz channels, including DFS channels, and operate at an Equivalent Isotropically Radiated Power (EIRP) up to 36 dBmi, depending on the channel. DFS channels are shared between WLANs (e.g., Wi-Fi® networks) and government entities. WLANs can use DFS channels but must forfeit the channel if a government agency starts using them. For example, wireless devices with DFS functionality can detect government use from radar pulses indicating the required departure of a DFS channel for at least 30 minutes. For an explanation of DFS Avoidance, the radar pulse indications are referred to herein as "radar event," "strike," or "radar strike."

Conventionally, an Access Point (AP) device with DFS functionality must perform a Channel Availability Check (CAC) on a DFS channel before use. During a CAC, the AP must remain silent (not transmit) on the DFS channel for a period, such as 60 seconds, before the AP can provide services to a client on the DFS channel. Upon detecting a radar event, the AP loses its operating channel. The radar event can be an actual radar event in which an actual radar signal is detected or, more commonly, a false radar event in which no actual radar signal is detected. In response to a radar event, whether real or false, the AP loses its operating channel and must move to another DFS channel or a non-DFS channel. If the AP moves to another DFS channel, the AP has to perform another CAC that lasts for another 60 seconds before serving clients again. The large number of false radar events and the time required to perform the CAC make using DFS channels challenging. Automatic channel selection (ACS) algorithms can make decisions on what channels to use. The conventional ACS algorithms, however, do not take into account the previous history of DFS radar strikes when selecting a channel. This results in wireless devices in the network selecting DFS channels (often the same exact ones), being knocked off the selected DFS channels due to radar strikes, and then later returning to the same DFS channels and repeating the cycle. This is problematic for wireless devices using DFS channels to obtain 160 MHz bandwidth. These wireless devices use 160 MHz whenever possible and stay on that channel as long as possible. Thus, finding the DFS channel that is least likely to see a radar strike is important. The occurrence of radar strikes often varies by region or network. Because of this, a solution that is local to each network is needed.

Aspects and embodiments of the present disclosure address the above and other deficiencies by providing logic that considers the previous history of DFS radar strikes when selecting a channel. Aspects and embodiments of the present disclosure can learn from activity on DFS channels in a wireless network to improve channel selection for wireless radios. Aspects and embodiments of the present disclosure can allow wireless devices to make better decisions on what channels to use by using radar strike history, maximizing time on wider channels (e.g., 80 MHz and 160 MHz channels). The wireless devices can provide DFS service to devices in the wireless network. For example, a wireless device can be an AP device and provide DFS service to endpoint devices, peer-to-peer devices such as wireless displays, wireless remote controls, game consoles, wireless gamepads, or the like. The wireless device can also provide DFS service to other AP devices and endpoint devices that do not have DFS capability without performing its own radar detection, channel availability check, or managing channel switches. The endpoint devices may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, voice-controlled devices, and the like. In response to a radar event, the wireless device sends a radar event notification to the endpoint device in response to a radar event detected by any wireless device with DFS capability in the wireless network.

FIG. 1 is a network diagram of wireless devices in a wireless network 100 with DFS avoidance logic 102 for channel selection based on historical radar data 112 stored locally in the WLAN, according to at least one embodiment. The wireless network 100 includes a first wireless device 104, a second wireless device 106, and a third wireless device 108. Each of the wireless devices 104, 106, 108 can be access point (AP) devices in the wireless network 100 and can provide network access to one or more endpoint devices (also referred to as client devices), such as client devices 118, 120, 122, 124, 126, and 128, respectively. Alternatively, the wireless devices 104, 106, and 108 can be endpoint devices that are not connected to downstream devices. The first wireless device 104 includes one or more processors, one or more radios, and a data store 110. In at least one embodiment, the wireless network 100 is a WLAN, and the first wireless device 104 includes a WLAN radio. Alternatively, the wireless network 100 is another type of wireless network in which DFS channels are available.

The first wireless device 104 includes DFS avoidance logic 102 and ACS logic 114. In at least one embodiment, the DFS avoidance logic 102 is stored as a set of instructions in a memory device of the wireless device 104. Alternatively, the first wireless device 104 includes processing logic comprising hardware, software, firmware, or any combination thereof to perform the operations of the DFS avoidance. In at least one embodiment, the ACS logic 114 is a set of instructions in a memory device of the wireless device 104. Alternatively, the first wireless device 104 includes processing logic comprising hardware, software, firmware, or any combination thereof to perform the operations of the channel selection. The wireless device 104 has DFS capability to detect a radar event 116. The DFS avoidance logic 102 can store information about the radar event 116 in historical radar data 112 in data store 110. Storing the historical radar data 112 locally in the wireless network 100 can be used by ACS logic 114 to improve channel selection. The wireless device 104 can share the historical radar data 112 with the other wireless devices 106 and 108. The wireless device s 106 and 108 can also include instances of DFS avoidance logic 102 and ACS logic 114. In at least one embodiment, the historical radar data 112 includes, for each historical radar event detected in the wireless network 100, a timestamp of the respective radar event and a first amount of time operating on a channel before the respective historical radar event. In a further embodiment, the historical radar data 112 further includes, for each historical radar event detected in the wireless network 100, a channel identifier and a bandwidth of the channel associated with the respective historical radar event. In at least one embodiment, the DFS avoidance logic 102 can store a list of radar events. Table 1 includes an example List of Radar Strikes.

TABLE 1

List of Radar Strikes

| Channel | Bandwidth | Radar Timestamp | Time On Channel |
|---|---|---|---|
| 52 | 20 | 1611079571 | 4 |
| 56 | 20 | 1611059572 | 1 |
| 60 | 40 | 1611039576 | .25 |
| 116 | 80 | 1611019578 | 26 |
| 36 | 160 | 1611019568 | 74 |
| 100 | 160 | 1611019572 | 14 |

In at least one embodiment, the List of Radar Strikes list includes i) an identifier of the respective DFS channel (e.g., 52, 56, 60, 116); ii) a first value indicating a bandwidth of the respective DFS channel (e.g., 20 MHz, 40 MHz, 80 MHz, 160 MHz, 240 MHz); iii) timestamp data of a respective radar event on the respective channel, and iv) an amount of time operating on the respective channel before the respective radar event. The DFS avoidance logic 102 can store the List of Radar Strikes to other devices. In at least one embodiment, the DFS avoidance logic 102 can share one or more entries or an entire copy of the List of Radar Strikes to other devices in the network, such as by broadcasting the List of Radar Strikes in an information element of a data frame. Alternatively, the DFS logic 102 can share the information of the List of Radar Strikes in other ways.

In at least one embodiment, the first wireless device 104 includes a wireless radio coupled to a processor. As described above, the data store 110 can store, for each historical radar event detected in the wireless network 100, a timestamp of the respective radar event and a first amount of time operating on a channel before the respective historical radar event. The DFS avoidance logic 102 can determine, for each of the historical radar events, a first score using a first weighting factor based on the first amount of time and a second weighting factor based on a second amount of time since the respective historical radar event. In at least one embodiment, the first weighting factor is selected from a set of weighting factors, each corresponding to a time range. In at least one embodiment, the set of weighting factors decreases as times of the time range increase. In at least one embodiment, the second weighting factor is determined by an exponential decay function based on the second amount of time. The DFS avoidance logic 102 can determine a second score for a first DFS channel by summing the first score for each historical radar event that occurred on the first DFS channel. The DFS avoidance logic 102 can determine a third score for a second DFS channel by summing the first score for each historical radar event that occurred on the second DFS channel. The ACS logic 114 can select the first DFS channel based on at least the second score and the third score. The first wireless device 104 can send data to a second device using the first DFS channel selected by the ACS logic 114. In at least one embodiment, the historical radar data 112 includes a channel identifier and a bandwidth value of the channel associated with the respective historical radar event. The DFS avoidance logic 102 (or ACS logic 114) can filter out some data in the historical radar data 112 outside a channel range corresponding to the first DFS channel using the respective channel identifier and the respective bandwidth of the channel before determining the second score for the first DFS channel. The DFS avoidance logic 102 (or ACS logic 114) can filter out some data in the historical radar data 112 outside a channel range corresponding to the second DFS channel before determining the third score for the second DFS channel.

Figure 2:
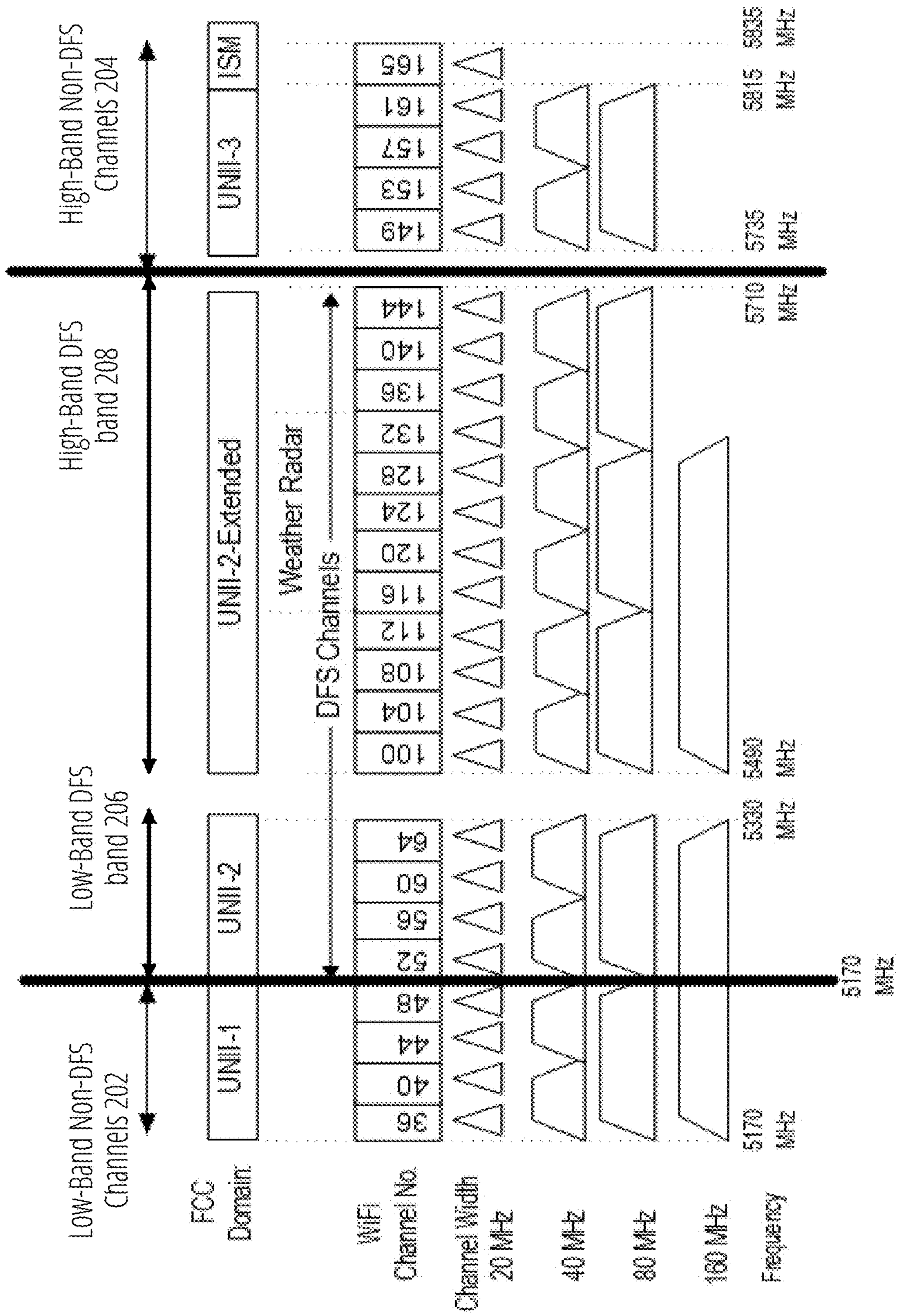
FIG. 2 is a graph that illustrates channel allocation by radios under a wireless local area network (WLAN) protocol, including DFS channels and non-DFS channels, according to an embodiment.

In at least one embodiment, the historical radar data 112 includes a first set of historical radar events associated with a first DFS band, such as Low-Band DFS band 206 of FIG. 2, and a second set of historical radar events associated with a second DFS band, such as High-Band DFS band 208. In at least one embodiment, the first DFS band includes the first DFS channel and the second DFS band includes the second DFS channel. In at least one embodiment, the first DFS band includes the first DFS channel and the second DFS channel, and the second DFS band includes a third DFS channel.

In at least one embodiment, the scores of the radar events can be combined with interference scores for channel selection. In at least one embodiment, the DFS avoidance logic 102 (or ACS logic 114) combines a first interference score and the second score to obtain a fifth score. The first interference score represents a first amount of interference on the first DFS channel. The DFS avoidance logic 102 (or ACS logic 114) combines a second interference score and the third score to obtain a seventh score. The second interference score represents a second amount of interference on the second DFS channel. The DFS avoidance logic 102 (or ACS logic 114) determines that the fifth score is less than the seventh score to select the first DFS channel. Alternatively, the DFS avoidance logic 102 (or ACS logic 114) determines that the seventh score is less than the fifth score to select the second DFS channel.

In at least one embodiment, a threshold can be used to remove some channels for selection. In at least one embodiment, the DFS avoidance logic 102 (or ACS logic 114) can determine whether the fifth or seventh score is less than a threshold representing DFS channels that should not be selected.

In at least one embodiment, the first wireless device 104 includes a DFS server programmed to operate the first wireless device 104 as a DFS group leader. In at least one embodiment, the DFS server is stored as a set of instructions in a memory device of the first wireless device 104. Alternatively, the first wireless device 104 includes processing logic comprising hardware, software, firmware, or any combination thereof to perform the operations of the DFS group leader. The DFS group leader provides a DFS service to multiple devices in a DFS coverage area, as described below. The other devices, including wireless devices 106, 108, 118, 120, 122, 124, 126, and 128, can be located in the same building as the first wireless device 104. The wireless devices 106, 108, 118, 120, 122, 124, 126, and 128 can each include a DFS client that communicates with the DFS group leader. In at least one embodiment, the DFS group leader is a standalone device responsible for performing CACs for one or more DFS channels. In at least one embodiment, the DFS server can store a DFS channel list. Table 2 includes an example DFS channel list.

TABLE 2

DFS Channel List

| Channel | Bandwidth | CAC Duration (sec) | Last CAC Timestamp | Last Radar Timestamp |
|---|---|---|---|---|
| 52 | 20 | 60 | 1511079571 | 1611079571 |
| 56 | 20 | 60 | 1511079572 | 1611059572 |
| 60 | 40 | 60 | 1511079573 | 1611039576 |
| 116 | 80 | 60 | 1511079570 | 1611019578 |
| 36 | 160 | 60 | 1511079520 | 1611019568 |
| 100 | 160 | 60 | 1511079500 | 1611019572 |

In at least one embodiment, the DFS channel list includes i) an identifier of the respective DFS channel (e.g., 52, 56, 60, 116); ii) a first value indicating a bandwidth of the respective DFS channel (e.g., 20 MHz, 40 MHz, 80 MHz, 160 MHz); iii) a second value indicating a duration of a channel availability check (CAC) specified for the respective DFS channel; iv) first timestamp data of a last CAC performed on the respective DFS channel; and v) second timestamp data of a last radar event on the respective DFS channel. The DFS server can update the first timestamp data after performing a CAC on the respective DFS channel. The DFS server can store the DFS channel list for providing to other DFS clients. In at least one embodiment, the DFS server can broadcast the DFS Channel List in an information element of its beacon frame, such as over the 2.4 GHz frequency band. In at least one embodiment, the DFS server can be queried via a port of the first wireless device 104. For example, a DFS client connected to the DFS group leader via a wired connection can request the DFS Channel List from a User Datagram Protocol (UDP) port of the DFS group leader. In at least one embodiment, the DFS client can send the request via the wired connection and receive a response via the wired connection. In at least one embodiment, the DFS client can send the request via the wired connection and receive a response via a wireless connection.

In another embodiment, a radar event can be detected by any one of the wireless devices in the wireless network and reported to a cloud controller 130 (or other types of centralized controllers inside or outside of the wireless network 100. The cloud controller 130 can include the DFS avoidance logic 102, the ACS logic 114, the data store 110 storing the historical radar data 112, or any combination thereof to facilitate DFS avoidance for channel selection.

FIG. 2 is a graph 200 that illustrates channel allocation by radios under a WLAN protocol, including DFS channels (in bands 206, 208) and non-DFS channels 202, 204, according to an embodiment. Across the top of the graph 200 are various UNII bands, which fall into Federal Communication Commission (FCC) regulated domains. The UNII-2 and UNII-2-Extended domains include DFS channels and overlapping channels for weather radar. Below the domain identifications are WiFi® channels, and below the WiFi® channels are illustrated potential communication link bandwidths that would subsume the above-identified WiFi® channels. For example, each discrete WiFi® channel spans over 20 MHz, and so any adjacent pair of channels spans 40 MHz, any series of four channels span 80 MHZ, and any series of eight channels span 160 MHz.

Although a radio may operate on one primary channel (e.g., channel (CH) 100), a radio can operate on a wider channel bandwidth, such as over 40, 80, or 160 MHz channel ranges. For example, consider bandwidth 80 MHz with primary channel 52 and secondary channels 56, 60, and 64 (each 20 MHz wide). An interference event present on the secondary channels 56, 60, and 64 may not be reported unless the communication link bandwidth is reduced to 20 MHz for detection purposes. A communication link, in this case, may be defined as operating on a channel and bandwidth with one or more 20 MHz channels as a "DFS radar channel" or "DFS channel."

Recognizing the fact that a DFS radar channel may be considered to include multiple secondary channels, two channel bandwidths may be defined for the communication link, namely an operating channel bandwidth and a communication link bandwidth. In various embodiments, the operating channel bandwidth is fixed at a maximum channel bandwidth allowed by the WLAN protocol for receiving data within the first primary channel and multiple secondary channels between two devices (e.g., two mesh network device devices or between a client wireless device and a mesh network device). According to complementary embodiments, the communication link bandwidth is set to a first frequency range and is adjustable by the radio to be identical to or lower than the operating channel bandwidth.

In one embodiment, the operating channel bandwidth of the communication link is channel 80 MHz with primary channel 52, whereas the communication link bandwidth could be 20 MHz. In this case, the radios in the communication link perform a 20 MHz frame exchange; however, the radios can still receive on the entire 80 MHz frequency band. The communication link bandwidth, however, could be expanded to include additional 20 MHz bands within the 80 MHz frequency band.

In the event of a radar event, a channel switch announcement (CSA) action frame can direct a device to switch from a DFS channel to a non-DFS channel, as described herein. In some cases, the non-DFS channel is selected from a same frequency band group as the DFS channel. In particular, a non-DFS channel can be selected from a low band group of non-DFS channels 202 corresponding to a low band DFS band 206. The channels in the low band group of non-DFS channels 202 can have similar signal propagation characteristics, attenuation factors, and output power as those in the low band DFS band 206. Another DFS channel can be selected from a high band group of non-DFS channels 204 corresponding to a high band DFS band 208. The channels in the high band group of non-DFS channels 204 can have similar signal propagation characteristics, attenuation factors, and output power as those in the high band DFS band 208. For each band group, the non-DFS channel can be selected by a remote server in order to minimize interference and avoid congestion and minimize interference.

Figure 3:
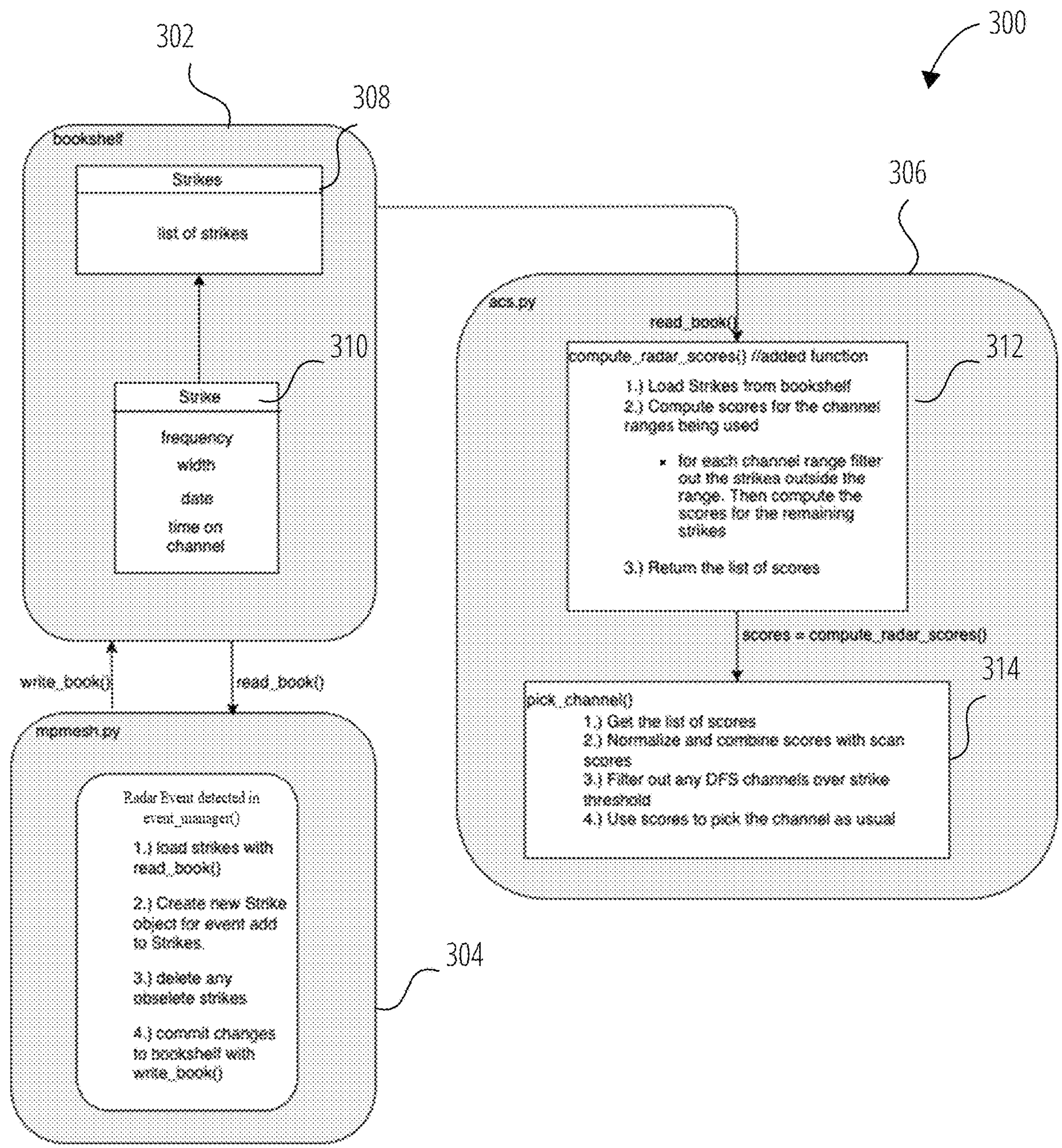
FIG. 3 is a block diagram of channel selection logic with DFS avoidance according to at least one embodiment.

FIG. 3 is a block diagram of channel selection logic with DFS avoidance 300 according to at least one embodiment. The channel selection logic with DFS avoidance 300 can include the DFS avoidance logic 102 and ACS logic 114 described above with respect to FIG. 1. The channel selection logic with DFS avoidance 300 can keep a history of its own radar strikes locally and use that data during a channel decision. It is not sufficient to use data from all networks (or across networks in a same region) because strike patterns can differ from network to network. Some networks see much more radar strikes than others and some networks see strikes only on the high band, only on the low band, or both. The channel decision should not be made just based on the majority of regional networks, for example. The strike prevalence can be similar in certain geographic regions, however, integrating this would require cloud input or static data. For that reason, in at least one embodiment, the channel selection logic with DFS avoidance 300 does not use geographic data. In other embodiments, the channel selection logic with DFS avoidance 300 can use geographic data in connection with the strike data for channel selection. It should be noted that although the description focuses on the 5 GHz band, the channel selection logic with DFS avoidance 300 can be used for other bands where the channel needs to be switched in response to radar strikes.

In at least one embodiment, the scores of the channels can be computed for each 20 MHz section on the band. That way, if 80 MHz is desired, the channel selection logic with DFS avoidance 300 can choose the best frequency range based on a summed score (or an average score in the range). This can assume the range is a valid frequency range under the wireless protocol. DFS channels tend to be equally clear, but one may be much more prone to radar strikes. By adding the radar strike score with the interference score, the channel selection logic with DFS avoidance 300 can choose a better DFS channel. It should be noted that the channel selection logic with DFS avoidance 300 needs to choose a non-overlapping channel. The center frequencies are regulated. For example, for 80 MHz of bandwidth, four DFS channel ranges can be used, and, for 160 MHz of bandwidth, there are two DFS ranges, as illustrated in FIG. 2. The channel selection logic with DFS avoidance 300 can also use radar strike scores to temporarily avoid a DFS channel if it sees strikes persistently. For example, if a channel score goes above a threshold (e.g., 400), the channel can be avoided. When the score falls back under another threshold (e.g., 200), the channel can be considered again. Since some DFS channels will be avoided (i.e., not selected), the scores will decrease over time since the scores are weighted by the amount of time since the strike.

In at least one embodiment, the channel selection logic with DFS avoidance 300 can store strike data for a period of time (e.g., 30 days) and delete any strikes past that data. In at least one embodiment, the channel selection logic with DFS avoidance 300 can store a set of a specified number of radar strikes locally. For example, the channel selection logic with DFS avoidance 300 can store 50 strikes (e.g., 50 entries) on a WLAN. In at least one embodiment, the channel selection logic with DFS avoidance 300 can store a first set of entries (e.g., 25 entries) for strikes from the low band and a second set of entries (e.g., 25 entries) for strikes from the high band. In this manner, if the high band is continually chosen every day, only 50 entries are saved, and data on the low band is still available. By storing two sets, the channel selection logic with DFS avoidance 300 can always have some data on the other channels to reference, so it can still make the right decision. Over time the data would become older and be weighed less. This will result in avoided channels slowly becoming more favorable the longer they have been unused. Additionally, more recent radar strike data will be weighed more because conditions can change rapidly.

In at least one embodiment, the channel selection logic with DFS avoidance 300 can maintain a single list of strikes, possibly making it easier to score strikes from a given frequency range, whether it be 20 MHz, 40 MHz, 80 MHz, or 160 MHz. The channel selection logic with DFS avoidance 300 can manage the single list such that there is always no more than 25 from the high band and no more than 25 from the low band. In at least one embodiment, the channel selection logic with DFS avoidance 300 can filter the single list by low and high ranges when deleting strikes. Then, if either of the filtered lists had more than 25 strikes, the channel selection logic with DFS avoidance 300 can select the oldest one from that list, and then delete that strike from the single list of strikes. In another embodiment, the strikes can be stored in two lists. In other embodiments, other numbers can be specified for the low and high bands, and they do not have to be equal. This allows the channel selection logic with DFS avoidance 300 to compute scores for any channel range, such as scores for both 160 MHz ranges.

In at least one embodiment, storing the strike data locally makes it easier to aggregate and calculate scores on a channel. In at least one embodiment, the strike data can be stored using a distributed, replicated database (e.g., in-memory database) that is shared among devices in the network and updated using the read/write book methods. Maintaining a maximum number of strikes and deleting obsolete strikes can ensure minimal local memory is used. In at least one embodiment, the list of strikes can keep at most 25 strikes from each of the low 5 GHz and high 5 GHz DFS frequency ranges. For example, when a strike is added, if more than 25 strikes have a frequency in the low range, the oldest low range strike will be deleted from the list of strikes.

In at least one embodiment, the channel selection logic with DFS avoidance 300 can calculate scores for four 80 MHz ranges ((5250-5330 MHz, 5490-5570 MHz, 5570-5650 MHz, 5650-5730 MHz). In another embodiment, the channel selection logic with DFS avoidance 300 can calculate scores for 20 MHz ranges, 40 MHz ranges, or 160 MHz ranges. The channel selection logic with DFS avoidance 300 can filter the strikes by their ranges and compute scores based on a channel range. For example, when using a bandwidth of 160 MHz on the high band, scores from both the high 80 MHz bands will be used. This allows the channel selection logic with DFS avoidance 300 to consider all the strikes in the desired channel range, compute the average score, and make a decision from the score. Additionally, the channel selection logic with DFS avoidance 300 can have the flexibility to score 20 MHz or 40 MHz channel ranges, if needed.

In some cases, every node in a network can report a radar strike it observes. As noted above, there is usually no more than one radar strike recorded daily. The channel selection logic with DFS avoidance 300 can confine radar strikes reported by multiple nodes within a short time frame (e.g., less than a minute or a specified number of seconds) to just one strike. In at least one embodiment, the node or nodes reporting a strike can also be stored in the data store, such as distributed, replicated data storage. The distributed, replicated data storage can be managed by a replicated state server, which is a software component in the network that keeps the wireless devices in the network synchronized. For example, the replicated state server can be the Bookshelf technology, developed by Amazon Technologies, that allows a state to be synchronized between wireless devices that are part of the WLAN. When a client application writes a value to a Bookshelf instance, that instance will update its local copy and forward the new value to all peers that are still reachable. For example, when a radar event is detected, the information about the radar event can be written to the Bookshelf. The Bookshelf can store a local copy of the information in the data store and forward the information to other devices in the WLAN. The information can include information about the strike and the state of the WLAN radio when the strike occurred, such as a channel identifier (or frequency) of a channel, a width of the channel (e.g., bandwidth value), a date (e.g., timestamp), and an amount of time on the channel before the strike. The Bookshelf can store other information. For example, the Bookshelf can be updated to include a node identifier, or a list of node identifiers that reported the strike. Because only one node should be writing to the Bookshelf, the node reporting the strike may have to communicate with whatever node writes to a Bookshelf instance to update this information. In another embodiment, each node can report its strikes into a replicated book, and a DFS group leader can collate the individual node responses. It should be noted that the channel selection logic with DFS avoidance 300 can support devices communicating with 160 MHz bandwidth in the U.S., as reflected in FIG. 2. In other embodiments, the channel selection logic with DFS avoidance 300 can support devices communicating with 160 MHz bandwidth in other countries according to the standards in the respective countries.

As illustrated in FIG. 3, channel selection logic with DFS avoidance 300 includes a Bookshelf instance 302, a radar event manager 304, and ACS logic 306. The Bookshelf instance 302 includes a list of strikes 308 with multiple entries, each storing strike data 310 (or strike data structure). The strike data 310 can include a channel identifier (or frequency) of a channel, a width of the channel (e.g., bandwidth value), a date (e.g., timestamp), and an amount of time on the channel before the strike. The radar event manager 304 can read and write to the Bookshelf instance 302 using write_book( ) and read_book( ) functions. The radar event manager 304 can detect a radar event from an event log managed by an event manager, such as the WPA supplicant. The radar event manager 304 can load strikes in the Bookshelf instance 302 using read_book( ) create new strike objects for an event and add the strike object to the Bookshelf instance 302, delete any obsolete strikes in the Bookshelf instance 302, and commit changes to the Bookshelf instance 302 with write_book( ) In at least one embodiment, the following code can be used to create a new strike object.

```
message Strike {
    uint32 channel_freq=1; //frequency network was on
        when strike occurred
    uint32 width=2; //width of channel operating on when
        strike occurred
    uint32 time_elapsed=3; //time elapsed since CAC
    Timestamp date=4//timestamp of event
message Strikes
    repeated Strike all_strikes=1; //List of all strikes in
        network
```

In another embodiment, a node identifier can be added to the strike data structure. The radar event manager 304 can use the following code to manage a strike and add it to the Bookshelf instance 302:

```
#added under if "DFS-RADAR-DETECTED" in the
    event_manager( ) function
#get the strikes structure, create a new strike, add the
    strike to the strikes structure, write
#changes to bookshelf
shelf strikes=read_book (books.Config.strikes)
strike=Strike( )
strike.width=radar_width
strike.time_elapsed=radar_time
strike.date=radar_date
if freq<5250 or freq>5730:
    self.log.info ("Reported frequency from radar strike not
        on a DFS channel")
shelf.strikes.strikes.append(strike)
self.log.debug("Added new strike with frequency % d on
    % s", radar_freq,radar_date)
write_book (books.Config.strikes, strikes)
```

As described above, the Bookshelf instance 302 can be used to store strikes for the network when they are encountered. The Bookshelf instance 302 can store the following components: frequency of the strike (e.g., or associated channel identifier), a timestamp, a time the network lasted on the channel before the strike, a width of the frequency ranges when the strike occurred (or recorded). The ACS logic 306 can use the strike data to calculate a change of a strike on the corresponding channel ranges. The ACS logic 306 can compute a score for each strike, considering how recent the strike was (i.e., first weighting factor) and the time on the channel before the strike (i.e., second weighting factor). The ACS logic 306 can sum all the scores of he strikes in the channel ranges. The ACS logic 306 can disregard any DFS channel with scores over the threshold (e.g., 400). The ACS logic 306 can compute channel interference scores of the channels. The ACS logic 306 can normalize and combine the strike scores with the channel interference scores. The ACS logic 306 can select the best channel using the new scores.

In at least one embodiment, the ACS logic 306 can use a first function 312 to load strikes from the Bookshelf instance 302 and compute scores for the desired channel ranges. For each channel range, the first function 312 can filter out the strikes outside the respective channel range, and then compute the scores for the remaining strikes. The first function 312 can return the list of scores. The ACS logic 306 can use a second function 314 to get the list of scores, normalize and combine scores with scan scores (e.g., channel interference scores), filter out any DFS channels over the strike threshold, and use the scores to pick the channel as usual (e.g., lowest score corresponds to the best score).

In at least one embodiment, the first function 312 can consider the number of strikes, recency of a strike, and duration on a channel before a strike. For example, a more recent strike should pull more weight, and a strike that happened very quickly after switching. In at least one embodiment, the first function 312 can calculate a score for a single strike with the following equation (1) (higher scores=worse channel):

$$\text{strike\_score} = 100 * {}_{(0.9)}{}^{(DaysSinceStrike)} * \text{TimeFactor} \quad (1)$$

, where TimeFactor is one of a fixed weighting factors based on a time range, and DaysSinceStrike is a number of days since the radar event occurred.

For example, the TimeFactor can be determined based on the amount of time operating on a channel (duration on the channel) based on the following scheme:

TimeFactor=1.25 if hours on channel<1;
TimeFactor=1 if hours on channel>=1 and <6;
TimeFactor=0.85 if hours on channel>=6 and <24;
TimeFactor=0.75 if hours on channel>=24 and <72; or
TimeFactor=0.65 if hours on channel>=72.

Alternatively, other weighting factors can be used for different time ranges.

Using the scheme above, the score of a strike can initially be between [65,125], and after one day, the score will be between [58.5,112.5], two days between [101.25,52.65], and so on until a score is insignificant. In other embodiments, other exponential decay functions, constants, scalers, and weighting factors for the TimeFactor can be used.

By adding the TimeFactor, strikes that occurred after being on the channel for a longer time are not scored as high and do not affect the total score as much. Similarly, strikes that occur within an hour of being on the channel indicate a highly utilized DFS channel and make the score higher. It should be noted that by raising a constant to DaysSinceStrike$_{(0.9)}{}^{(DaysSinceStrike)}$, the equation ensures that older data is degraded and not weighed as much. The scores for a channel range would then be expressed as follows in equation (2):

$$\text{Channel\_score} = \text{sum(strikes in channel)} \quad (2)$$

In at least one embodiment, the channel selection logic with DFS avoidance 300 can use the equation above, but can also have other score techniques, such as avoiding the channel that has seen the most recent strike, picking the channel with the lowest average strikes in the last 30 days.

In at least one embodiment, the second function 314 (e.g., pick_channel( ) function) can be configured not to consider any DFS channels that have a channel score above the threshold (e.g., 400). A score will typically rise over 400 after seeing a strike 3 or 4 days in a row. Secondly, if there are DFS channels under that threshold, they can be normalized to a range that makes sense to add the score to the interference score [0,1]. In most cases, DFS interference scores can be close to zero, so picking between two DFS channels will be mostly decided by scores from the radar scores. But, normalizing and combining the scores ensures that a DFS channel with high interference is not picked based on its radar strike history only. The thresholds and scoring constants can be adjustable through feature flags to allow flexibility in testing and implementation.

Figure 4:
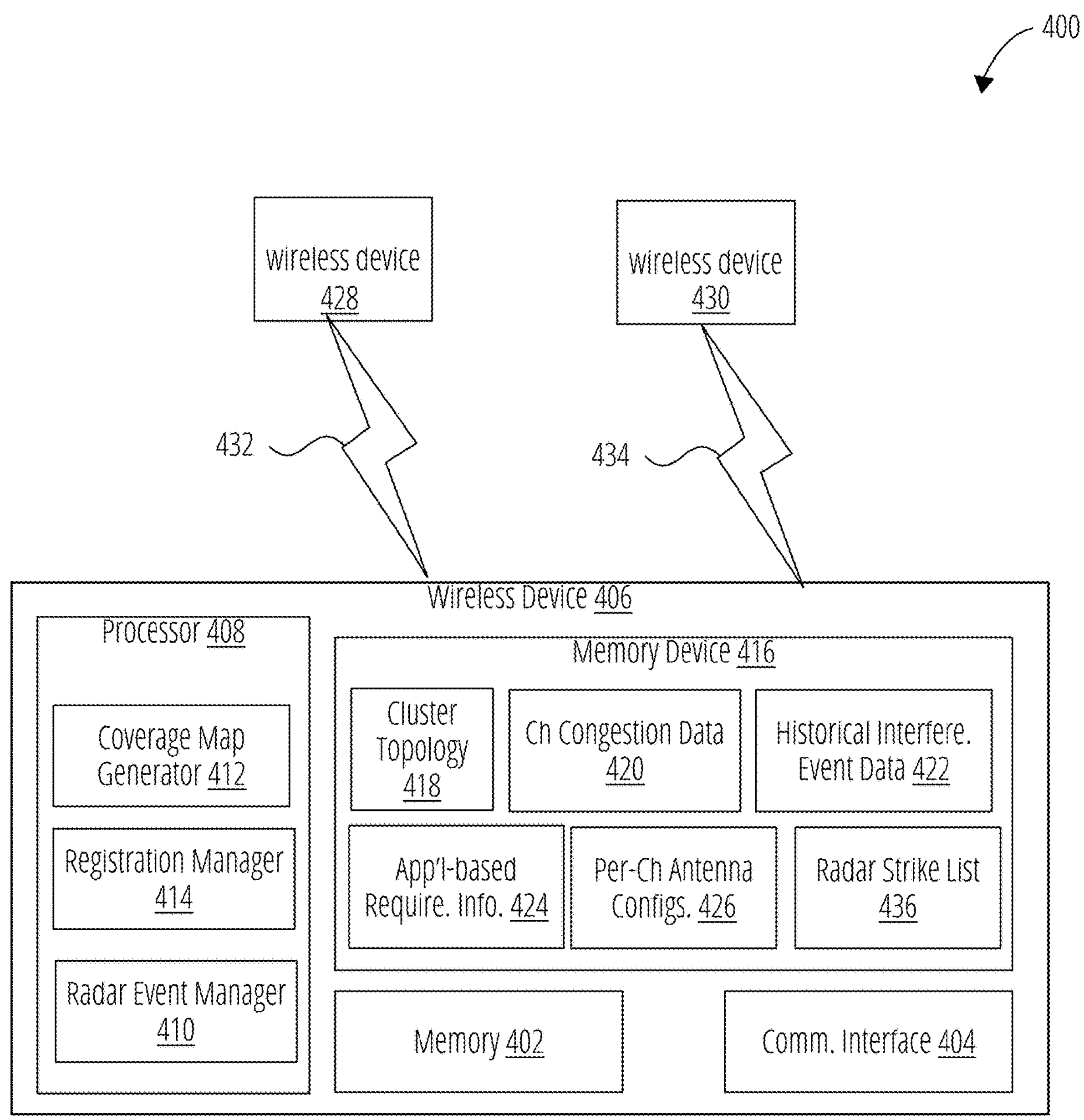
FIG. 4 is a block diagram of a wireless device with DFS avoidance logic for channel selection in a WLAN 400 according to at least one embodiment.

FIG. 4 is a block diagram of a wireless device 406 with DFS avoidance logic for channel selection in a WLAN 400 according to at least one embodiment. The wireless device 406 can be an AP device, a gateway device, a network device, a node, or the like. The wireless device 406 can communicate with other wireless devices 428, 430 in the WLAN 400 over wireless connections 432, 434. In various embodiments, the wireless device 406 may include memory 402, a communication interface 404, a processor 408, and a memory device 416. The communication interface 404, which may include one or more network devices for connecting to the Internet, may be adapted to also wirelessly couple the wireless device 406 to the wireless devices 428 and 430 and communicate data with the wireless devices 428 and 430 as described herein. The data received from the wireless devices 428 and 430 may include, for example, cluster topology information, such as node location, historical interference event data (e.g., which mesh network devices detected interference events on which channels), historical data transfer rate requirements (e.g., from applications on the client wireless devices), historical application-based throughput and latency requirements (e.g., by content streaming applications of the client wireless devices over particular channels), per-channel antenna configurations, and channel congestion data associated with particular channels on which the multiple mesh network devices communicate. The received data may further include information associated with, or useable to determine, pattern recognition and learning associated with radar event detection, data bandwidth requirements, latency requirements, and the like. The received data may also include scan lists, proximity data, DFS channels, requirement sets, List of Radar Strikes, or the like, as described above with respect to FIG. 1 to FIG. 3.

In embodiments, the memory device 416 includes data stored, which are related to channels of the mesh network devices and associated with cluster topology information 418 of the WLAN 400, channel congestion data 420, historical interference event data 422, historical application-based requirements information 424 (e.g., historical application-based throughput and latency requirements), per-channel antenna configurations 426, and a Radar Strike List 436 (such as described above). The memory device 416 can also store data to be used for the DFS service, including the DFS channels and fallback channels of the DFS channels. The wireless device 406 can be coupled to a public or private network (not illustrated) over an Internet or WAN connection. Such an Internet or WAN connection may include additional links or trunks, whether wired or wireless, that may involve other types of wideband communication, including those based on cellular standard(s).

In various embodiments, the processor 408 (e.g., processing device) includes a coverage map data manager 412, a registration manager 414, and a radar event manager 410. The coverage map data manager 412 can collect information from the devices to generate and maintain coverage map data for the DFS master service. The registration manager 414 can manage registration requests by other wireless devices (e.g., 428 and 430) interested in radar event notifications so that the wireless devices or endpoint device(s) can use the DFS channels. The wireless devices or endpoint device(s) may not have radar detection capability, but by registering with the registration manager 414, the wireless devices or endpoint device(s) can receive radar event notifications. The radar event manager 410 can receive notifications regarding radar events from the devices. The radar event manager 410 can assist the wireless devices or endpoint device(s) in receiving the radar event notifications when registered with the registration manager 414. It should be noted that the wireless devices or endpoint device(s) can receive the radar event notifications from the radar event manager 410 or other sources. In at least one embodiment, the radar event manager 410 is similar to the radar even radar event manager 304 of FIG. 3. In at least one embodiment, the radar event manager 410 can use the Radar Strike List 436 to calculate scores for channels for selecting a DFS channel based on the scores as described above.

Figure 5A:
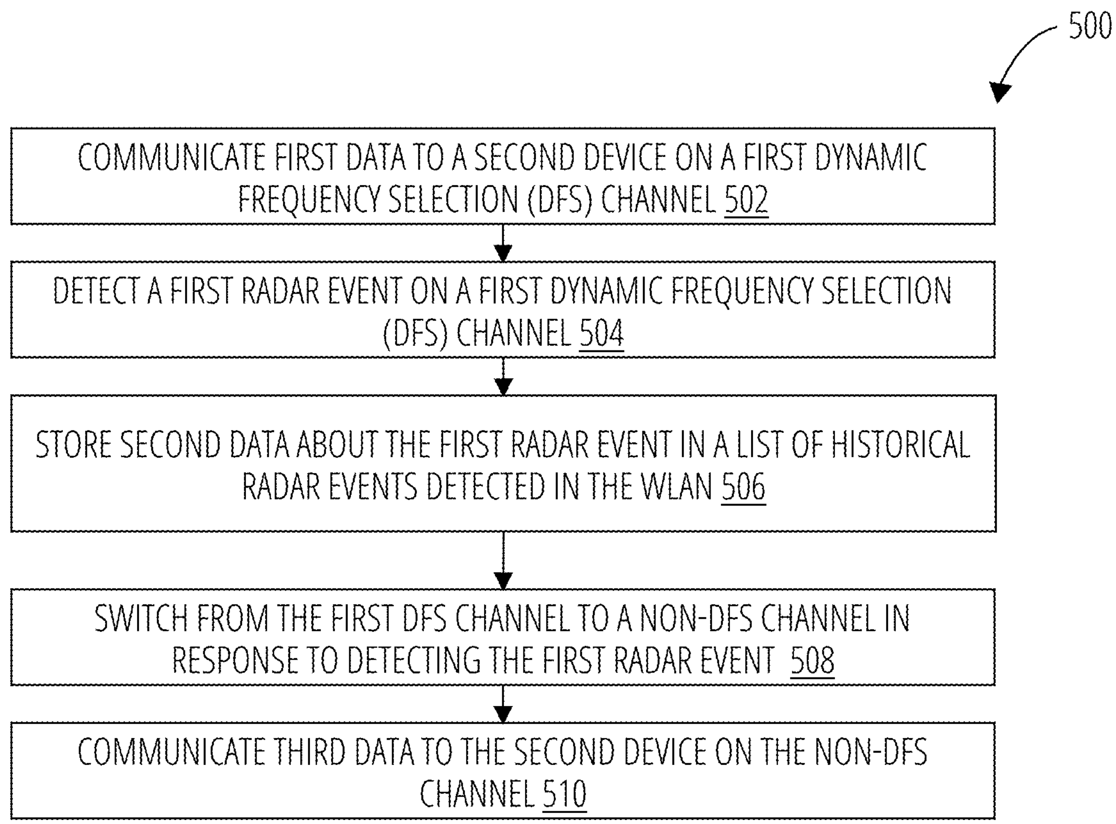
FIG. 5A-FIG. 5B illustrates a method of channel selection using historical radar events according to at least one embodiment.
Figure 5B:
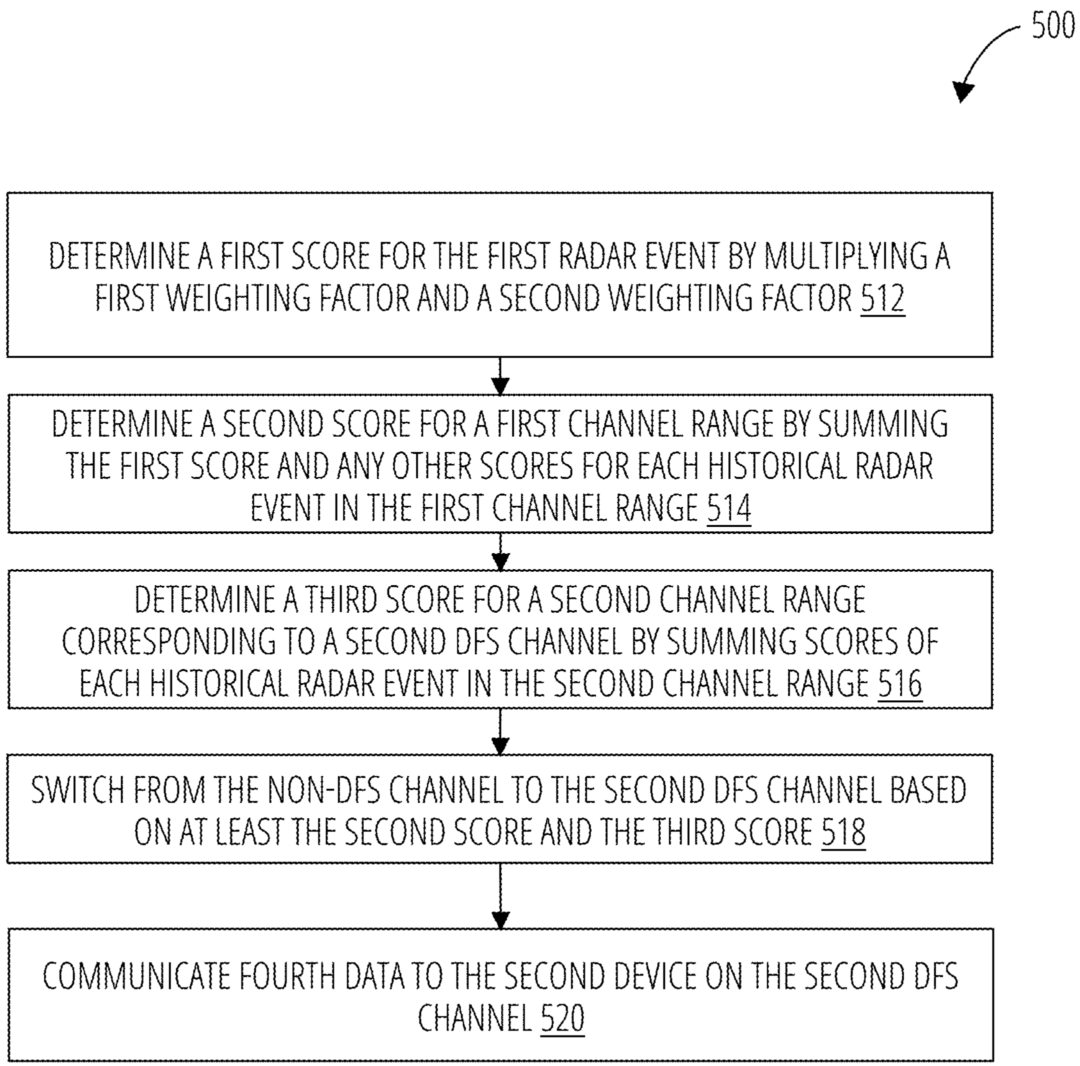

FIG. 5A-FIG. 5B illustrates a method 500 of channel selection using historical radar events according to at least one embodiment. The method 500 may be performed by processing logic that comprises hardware (e.g., circuitry, dedicated logic, programmable logic, microcode, etc.), software, firmware, or a combination thereof. In one embodiment, the method 500 may be performed by any of the wireless devices described herein and illustrated with respect to FIG. 1 to FIG. 4.

Referring to FIG. 5A, the method 500 begins, at a first time, with the processing logic communicating first data to a second device on a first DFS channel (block 502). The processing logic detects a first radar event on the first DFS channel (block 504). The processing logic stores second data about the first radar event in a list that includes information about historical radar events detected in the WLAN (block 506). The second data includes at least a first timestamp of the first radar event, a first channel identifier of the first DFS channel, an operating bandwidth of the first DFS channel, and a first amount of time operating on the first DFS channel before the first radar event (e.g., the time elapsed since CAC). The processing logic switches from the first DFS channel to a non-DFS channel in response to detecting the first radar event (block 508). In at least one embodiment, the processing logic sends a CSA frame to a second device, the CSA indicating the switch from the first DFS channel to the non-DFS channel. The processing logic communicates third data to the second device on the non-DFS channel (block 510).

Referring to FIG. 5B, the method 500 continues and, at a second time after the first time, determines a first score for the first radar event by multiplying a first weighting factor and a second weighting factor (block 512). At block 512, the first weighting factor is selected from a set of fixed weighting factors based on the first amount of time, each of the set of fixed weighting factors corresponding to a different time range. At block 512, the second weighting factor is determined using an exponential decay function based on a second amount of time since the first radar event. In at least one embodiment, each weighting factor of the set of fixed weighting factors corresponds to a different time range, and the fixed weighting factor for the time range in which the first amount of time is found is selected. The processing logic can determine a first score for each historical radar event. The first scores can be calculated for 20 MHz channels, 40 MHz channels, and 80 MHz channels, allowing scores to be determined for larger channel ranges, such as the 40 MHz channels, by summing the scores for the 20 MHz channels, 80 MHz channels by summing the scores of the 20 MHz or 40 MHz channels, 160 MHz channels by summing the scores of the 20 MHZ, 40 MHZ, or 80 MHz channels. At block 514, the processing logic determines a second score for a first channel range by summing the first score and any other scores for each historical radar event in the first channel range. At block 516, the processing logic determines a third score for a second channel range corresponding to a second DFS channel by summing scores of each historical radar event in the second channel range. The processing logic can determine that the second DFS channel has the best score. At block 518, the processing logic switches from the non-DFS channel to the second DFS channel based on at least the second score and the third score. At block 520, the processing logic communicates fourth data to the second device on the second DFS channel.

In a further embodiment, the list of historical radar events includes a first set of historical radar events associated with a first DFS band with the first DFS channel, and a second set of historical radar events associated with a second DFS band with the second DFS channel. The frequencies of the first DFS band are lower than the frequencies of the second DFS band.

In at least one embodiment, the processing logic combines a fourth score and the second score to obtain a fifth score, where the fourth score represents a first amount of interference on the first DFS channel. The processing logic can combine a sixth score and the third score to obtain a seventh score, where the sixth score represents a second amount of interference on the second DFS channel. The processing logic can determine whether the fifth score and/or the seventh score are less than a threshold representing DFS channels that should not be selected. The processing logic can determine the lowest score for selecting the channel. In at least one embodiment, the processing logic determines that the seventh score is less than the fifth score to switch from the non-DFS channel to the second DFS channel.

Figure 6:
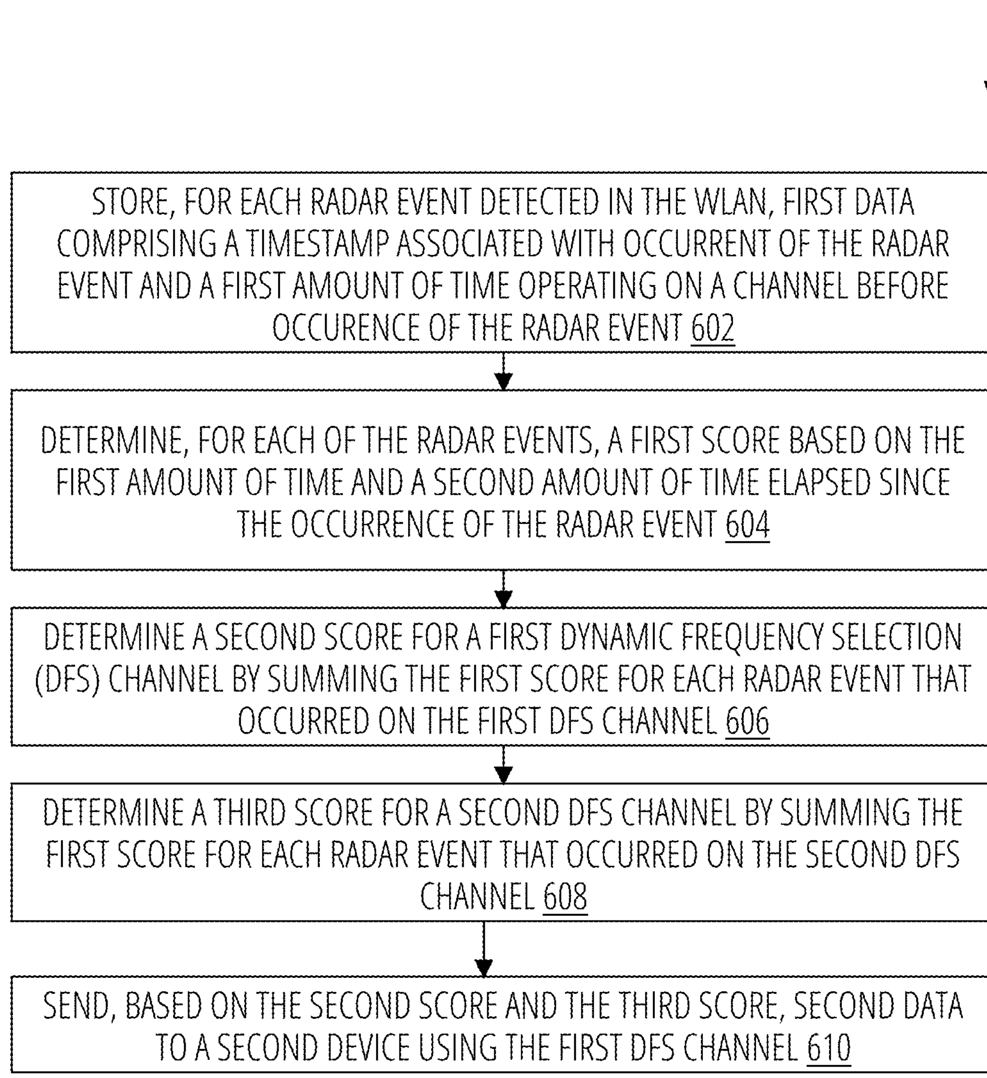
FIG. 6 illustrates a method of channel selection using historical radar events according to at least one embodiment.

FIG. 6 illustrates a method 600 of channel selection using historical radar events according to at least one embodiment. The method 600 may be performed by processing logic that comprises hardware (e.g., circuitry, dedicated logic, programmable logic, microcode, etc.), software, firmware, or a combination thereof. In one embodiment, the method 600 may be performed by any of the wireless devices described herein and illustrated with respect to FIG. 1 to FIG. 4.

Referring to FIG. 6, the method 600 begins with the processing logic storing, for each radar event, from among multiple radar events, detected in the WLAN, first data including at least a timestamp associated with an occurrence of the radar event and a first amount of time operating on a channel before the occurrence of the radar event (block 602). The first data can include information about the radar event and state information of the wireless device at the time of the radar event. For example, the first data can include the timestamp (date and time), the first amount of time operating on a channel before the radar event, a frequency or channel identifier for the operating channel of the wireless device at the time of the radar event, a bandwidth value (or identifier) of the operating channel, a node identifier, or the like. The first data can include a total number of radar events (strikes), an average number of radar events over time, an amount of time on a channel with a specified frequency range/bandwidth, a channel utilization metric, or the like.

At block 604, the processing logic determines, for each radar event, a first score based on the first amount of time and a second amount of time, the second amount of time being time elapsed since the occurrence of the radar event. At block 606, the processing logic determines a second score for a first DFS channel by summing the first score for each radar event that occurred on the first DFS channel. At block 608, the processing logic determines a third score for a second DFS channel by summing the first score for each radar event that occurred on the second DFS channel. The processing logic can determine a second score for each channel of a set of channels by summing the first score for each radar event that occurred on the respective channel. The processing logic can select the first DFS channel based on at least the second score and the third score. For example, the processing logic can select a channel from a set of channels based on the lowest score. At block 610, the processing logic sends, based on the second score and the third score, second data to a second device using the first DFS channel.

In at least one embodiment, the processing logic determines the first score by determining a first weighting factor. The first weighting factor is one of a set of weighting factors, each corresponding to a time range. In at least one embodiment, the set of weighting factors decreases as times of the time range increase. In at least one embodiment, the processing logic determines the first score by determining a second weighting factor using an exponential decay function that is based on the second amount of time. That is, the second weighting factor has an exponential decay over time from the time of the radar event.

In at least one embodiment, the first data includes a first set of historical radar events associated with a first DFS band with the first DFS channel and a second set of historical radar events associated with a second DFS band with the second DFS channel. In at least one embodiment, the processing logic detects a first subsequent radar event. The processing logic stores in the first data a timestamp associated with an occurrence of the first subsequent radar event and a third amount of time operating on a channel before the occurrence of the first subsequent radar event. The processing logic determines that a number of the set of radar events, including the first subsequent radar event, exceeds a threshold number of radar events associated with a first DFS band including the first DFS channel. The processing logic removes an oldest radar event of the set of radar events from the first data, the oldest radar event being associated with the first DFS band.

In at least one embodiment, the first data includes a first set of historical radar events associated with a first DFS band with the first DFS channel and the second DFS channel, and a second set of historical radar events associated with a second DFS band with a third DFS channel. In at least one embodiment, the processing logic detects a second subsequent radar event. The processing logic stores in the first data a timestamp associated with an occurrence of the second subsequent radar event and a fourth amount of time operating on a channel before the occurrence of the second subsequent radar event. The processing logic determines that a number of the set of radar events, including the second subsequent radar event, exceeds a threshold number of radar events associated with a second DFS band including the second DFS channel. The processing logic removes an oldest radar event of the set of radar events from the first data, the oldest radar event being associated with the second DFS band.

In a further embodiment, the processing logic combines a fourth score and the second score to obtain a fifth score, where the fourth score represents a first amount of interference on the first DFS channel. The processing logic can combine a sixth score and the third score to obtain a seventh score, where the sixth score represents a second amount of interference on the second DFS channel. The processing logic can determine that the fifth score is less than the seventh score to select the first DFS channel. In at least one embodiment, the processing logic determines that the fifth score and the seventh score are less than a threshold that represents DFS channels that should not be selected.

In at least one embodiment, the first data further includes, for each historical radar event detected in the WLAN, a channel identifier and information about a bandwidth of the channel associated with the respective historical radar event. Prior to determining the second score, the processing logic can filter out a first portion of the first data corresponding to the radar events outside a channel range corresponding to the first DFS channel using the respective channel identifier and the information about the respective bandwidth of the channel. The processing logic can filter out a second portion of the first data corresponding to the radar events outside a channel range corresponding to the second DFS channel using the respective channel identifier and the information about the respective bandwidth of the channel.

In at least one embodiment, the processing logic adds a fourth score, associated with a third DFS channel, to the second score to obtain a fifth score, the fifth score corresponding to a first channel range, including the first DFS channel and the third DFS channel. The processing logic determines that the fifth score is less than a sixth score corresponding to a second channel range, including the second DFS channel. In at least one embodiment, the processing logic adds the second score and the third score to obtain a fourth score corresponding to a first channel range, including the first DFS channel, and the second DFS channel. The processing logic determines that the fourth score is less than a fifth score corresponding to a second channel range, including a third DFS channel.

In at least one embodiment, the processing logic detects a first radar event. The processing logic can store in the first data a timestamp associated with an occurrence of the first radar event and a third amount of time operating on a channel before the occurrence of the first radar event. The processing logic can send at least a portion of the first data to a second device that is part of the WLAN in response to detecting the first radar event.

Figure 7:
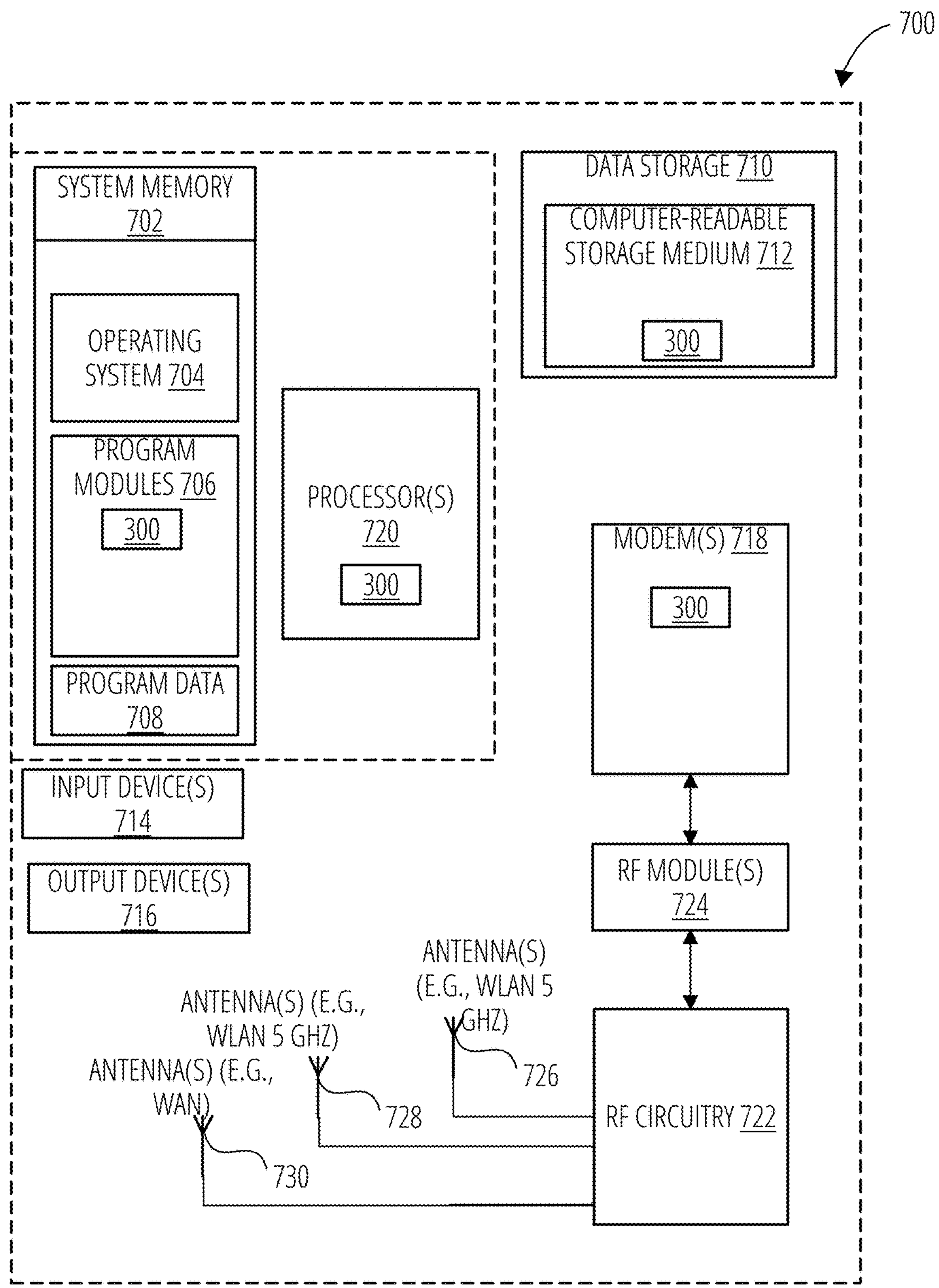
FIG. 7 is a block diagram of a wireless device with channel selection logic with DFS avoidance according to one embodiment.

FIG. 7 is a block diagram of a wireless device 700 with channel selection logic with DFS avoidance 300 according to one embodiment. The wireless device 700 may correspond to the wireless devices described above with respect to FIG. 1 to FIG. 6. Alternatively, the wireless device 700 may be other electronic devices, as described herein.

The wireless device 700 includes one or more processor(s) 720, such as one or more CPUs, microcontrollers, field programmable gate arrays, or other types of processors. The wireless device 700 also includes system memory 702, which may correspond to any combination of volatile and/or non-volatile storage mechanisms. The system memory 702 stores information that provides operating system 704, various program modules 706, program data 708, and/or other components. In one embodiment, the system memory 702 stores instructions of methods to control the operation of the wireless device 700. The wireless device 700 performs functions using the processor(s) 720 to execute instructions provided by the system memory 702. In one embodiment, the program modules 706 may include channel selection logic with DFS avoidance 300. The channel selection logic with DFS avoidance 300 may perform some of the operations of the processes described herein.

The wireless device 700 also includes a data storage device 710 that may be composed of one or more types of removable storage and/or one or more types of non-removable storage. The data storage device 710 includes a computer-readable storage medium 712, on which is stored one or more sets of instructions embodying any of the methodologies or functions described herein. Instructions for the program modules 706 (e.g., channel selection logic with DFS avoidance 300) may reside, completely or at least partially, within the computer-readable storage medium 712, system memory 702, and/or within the processor(s) 720 during execution thereof by the wireless device 700, the system memory 702 and the processor(s) 720 also constituting computer-readable media. The wireless device 700 may also include one or more input devices 714 (keyboard, mouse device, specialized selection keys, etc.) and one or more output devices 716 (displays, printers, audio output mechanisms, etc.).

The wireless device 700 further includes a modem 718 to allow the wireless device 700 to communicate via wireless connections (e.g., provided by the wireless communication system) with other computing devices, such as remote computers, an item-providing system, and so forth. The modem 718 can be connected to one or more radio frequency (RF) modules 724. The RF modules 724 may be a WLAN module, a WAN module, a PAN module, a GPS module, or the like. The antenna structures (antenna(s) 726, 728, 730,) are coupled to the RF circuitry 722, which is coupled to the modem 718. The RF circuitry 722 may include radio front-end circuitry, antenna switching circuitry, impedance matching circuitry, or the like. The antennas 726 may be GPS antennas, NFC antennas, other WAN antennas, WLAN or PAN antennas, or the like. The modem 718 allows the wireless device 700 to handle both voice and non-voice communications (such as communications for text messages, multimedia messages, media downloads, web browsing, etc.) with a wireless communication system. The modem 718 may provide network connectivity using any type of mobile network technology, including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 718 may generate signals and send these signals to an antenna(s) 726 of a first type (e.g., WLAN 5 GHZ), antenna(s) 728 of a second type (e.g., WLAN 2.4 GHZ), and/or antenna(s) 730 of a third type (e.g., WAN), via RF circuitry 722, and RF module(s) 724 as descried herein. Antennas 726, 728, 730 may be configured to transmit in different frequency bands and/or using different wireless communication protocols. The antennas 726, 728, 730 may be directional, omnidirectional, or non-directional antennas. In addition to sending data, antennas 726, 728, 730 may also receive data, which is sent to appropriate RF modules connected to the antennas. One of the antennas 726, 728, 730 may be any combination of the antenna structures described herein.

In one embodiment, the wireless device 700 establishes a first connection using a first wireless communication protocol, and a second connection using a different wireless communication protocol. The first wireless connection and second wireless connection may be active concurrently, for example, if a network hardware device is receiving a media item from another network hardware device (e.g., a mini-POP node) via the first connection) and transferring a file to another electronic device (e.g., via the second connection) at the same time. Alternatively, the two connections may be active concurrently during wireless communications with multiple devices. In one embodiment, the first wireless connection is associated with a first resonant mode of an antenna structure that operates at a first frequency band, and the second wireless connection is associated with a second resonant mode of the antenna structure that operates at a second frequency band. In another embodiment, the first wireless connection is associated with a first antenna structure, and the second wireless connection is associated with a second antenna. In other embodiments, the first wireless connection may be associated with content distribution within mesh nodes of the WMN, and the second wireless connection may be associated with serving a content file to a client consumption device, as described herein.

Though a modem 718 is shown to control transmission and reception via the antenna(s) (726, 728, 730), the wireless device 700 may alternatively include multiple modems, each of which is configured to transmit/receive data via a different antenna and/or wireless transmission protocol.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk, including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A method of operating a wireless device in a wireless local area network (WLAN), the method comprising:
at a first time:
communicating first data to a second device on a first dynamic frequency selection (DFS) channel;
detecting a first radar event on the first DFS channel;
storing second data about the first radar event in a list that includes information about historical radar events detected in the WLAN, the second data comprising a first timestamp of the first radar event, a first channel identifier of the first DFS channel, an operating bandwidth of the first DFS channel, and a first amount of time operating on the first DFS channel before the first radar event;
switching from the first DFS channel to a non-DFS channel in response to detecting the first radar event;
communicating third data to the second device on the non-DFS channel; and
at a second time after the first time:
determining a first score for the first radar event by multiplying a first weighting factor and a second weighting factor, wherein the first weighting factor is selected from a plurality of fixed weighting factors based on the first amount of time, each of the plurality of fixed weighting factors corresponding to a different time range, and wherein the second weighting factor is determined using an exponential decay function based on a second amount of time since the first radar event;
determining a second score for a first channel range by summing the first score and any other scores for each historical radar event in the first channel range;
determining a third score for a second channel range corresponding to a second DFS channel by summing scores of each historical radar event in the second channel range;
switching from the non-DFS channel to the second DFS channel based on at least the second score and the third score; and
communicating fourth data to the second device on the second DFS channel.

2. The method of claim 1, wherein the list of historical radar events comprising:
a first set of historical radar events associated with a first DFS band comprising the first DFS channel; and
a second set of historical radar events associated with a second DFS band comprising the second DFS channel, wherein frequencies of the first DFS band are lower than frequencies of the second DFS band.

3. The method of claim 1, further comprising:
combining a fourth score and the second score to obtain a fifth score, wherein the fourth score represents a first amount of interference on the first DFS channel;
combining a sixth score and the third score to obtain a seventh score, wherein the sixth score represents a second amount of interference on the second DFS channel;
determining that the fifth score and the seventh score are less than a threshold that represents DFS channels that should not be selected; and
determining that the seventh score is less than the fifth score to switch from the non-DFS channel to the second DFS channel.

4. A method comprising:
storing, by a wireless device that is part of a wireless local area network (WLAN), for each radar event, from among a plurality of radar events, detected in the WLAN, first data comprising a timestamp associated with an occurrence of the radar event and a first amount of time operating on a channel before the occurrence of the radar event;
determining, by the wireless device for each radar event, a first score based on the first amount of time and a second amount of time, the second amount of time being time elapsed since the occurrence of the radar event;
determining, by the wireless device, a second score for a first dynamic frequency selection (DFS) channel by summing the first score for each radar event that occurred on the first DFS channel;
determining, by the wireless device, a third score for a second DFS channel by summing the first score for each radar event that occurred on the second DFS channel; and
sending, by the wireless device and based on the second score and the third score, second data to a second wireless device using the first DFS channel.

5. The method of claim 4, wherein determining the first score further comprises:
determining a first weighting factor, wherein the first weighting factor is one of a plurality of weighting factors, each corresponding to a time range;
and
determining a second weighting factor using an exponential decay function that is based on the second amount of time.

6. The method of claim 4, further comprising:
detecting, by the wireless device, a first subsequent radar event;

storing, by the wireless device, in the first data a timestamp associated with an occurrence of the first subsequent radar event and a third amount of time operating on a channel before the occurrence of the first subsequent radar event;

determining, by the wireless device, that a number of the plurality of radar events, including the first subsequent radar event, exceeds a threshold number of radar events associated with a first DFS band comprising the first DFS channel; and removing, by the wireless device, an oldest radar event of the plurality of radar events from the first data, wherein the oldest radar event is associated with the first DFS band.

7. The method of claim 6, further comprising:

detecting, by the wireless device, a second subsequent radar event;

storing, by the wireless device, in the first data a timestamp associated with an occurrence of the second subsequent radar event and a fourth amount of time operating on a channel before the occurrence of the second subsequent radar event;

determining, by the wireless device, a number of the plurality of radar events, including the second subsequent radar event, exceeds a threshold number of radar events associated with a second DFS band comprising the second DFS channel; and removing, by the wireless device, an oldest radar event of the plurality of radar events from the first data, wherein the oldest radar event is associated with the second DFS band.

8. The method of claim 4, further comprising, prior to sending the second data:

combining a fourth score and the second score to obtain a fifth score, wherein the fourth score represents a first amount of interference on the first DFS channel;

combining a sixth score and the third score to obtain a seventh score, wherein the sixth score represents a second amount of interference on the second DFS channel; and determining that the fifth score is less than the seventh score.

9. The method of claim 8, further comprising determining that the fifth score and the seventh score are less than a threshold that represents DFS channels that should not be selected.

10. The method of claim 4, wherein the first data further comprises a channel identifier and information about a bandwidth of the channel associated with the respective radar event, wherein the method further comprises:

prior to determining the second score, filtering out a first portion of the first data corresponding to radar events outside a channel range corresponding to the first DFS channel using the respective channel identifier and the information about the respective bandwidth of the channel; and prior to determining the third score, filtering out a second portion of the first data corresponding to historical radar events outside a channel range corresponding to the second DFS channel using the respective channel identifier and the information about the respective bandwidth of the channel.

11. The method of claim 4, further comprising, prior to sending the second data:

adding a fourth score, associated with a third DFS channel, to the second score to obtain a fifth score, the fourth score corresponding to a first channel range comprising the first DFS channel and the third DFS channel; and determining that the fifth score is less than a sixth score corresponding to a second channel range comprising the second DFS channel.

12. The method of claim 4, further comprising:

adding the second score and the third score to obtain a fourth score corresponding to a first channel range comprising the first DFS channel and the second DFS channel; and determining that the fourth score is less than a fifth score corresponding to a second channel range comprising a third DFS channel.

13. The method of claim 4, further comprising:

detecting, by the wireless device, a first radar event;

storing, by the wireless device, in the first data a timestamp associated with an occurrence of the first radar event and a third amount of time operating on a channel before the occurrence of the first radar event; and sending at least a portion of the first data to a second device that is part of the WLAN.

14. A wireless device that is part of a wireless local area network (WLAN), the wireless device comprising:

a WLAN radio;

a memory device to store, for each radar event, from a plurality of radar events, detected in the WLAN, first data comprising a timestamp associated with an occurrence of the radar event and a first amount of time operating on a channel before the occurrence of the radar event;

a processor coupled to the WLAN radio and the memory device, wherein the processor is to:

determine, for each radar event, a first score based on the first amount of time and a second amount of time, the second amount of time being time elapsed since the occurrence of the radar event;

determine a second score for a first dynamic frequency selection (DFS) channel by summing the first score for each radar event that occurred on the first DFS channel;

determine a third score for a second DFS channel by summing the first score for each historical radar event that occurred on the second DFS channel; and send, based on the second score and the third score, second data to a second device using the first DFS channel.

15. The wireless device of claim 14, wherein the processor is to determine the first score by:

determining a first weighting factor, wherein the first weighting factor is one of a plurality of weighting factors, each corresponding to a time range; and determining a second weighting factor using an exponential decay function that is based on the second amount of time.

16. The wireless device of claim 14, wherein the first data comprises a first set of historical radar events associated with a first DFS band comprising the first DFS channel and a second set of historical radar events associated with a second DFS band comprising the second DFS channel.

17. The wireless device of claim 14, wherein the first data comprises a first set of historical radar events associated with a first DFS band comprising the first DFS channel and the second DFS channel, and a second set of historical radar events associated with a second DFS band comprising a third DFS channel and a third DFS channel.

18. The wireless device of claim 14, wherein the processor, prior to the second data being sent, is further to:

combine a fourth score and the second score to obtain a fifth score, wherein the fourth score represents a first amount of interference on the first DFS channel;

combine a sixth score and the third score to obtain a seventh score, wherein the sixth score represents a second amount of interference on the second DFS channel; and determine that the fifth score is less than the seventh score.

19. The wireless device of claim 14, wherein the processor is further to:

detect a subsequent radar event;

store, by the wireless device, in the first data a timestamp associated with an occurrence of the subsequent radar event and a third amount of time operating on a channel before the occurrence of the subsequent radar event;

determine, by the wireless device, that a number of the plurality of radar events, including the subsequent radar event, exceeds a threshold number of radar events associated with a first DFS band comprising the first DFS channel; and remove, by the wireless device, an oldest radar event of the plurality of radar events from the first data, wherein the oldest radar event is associated with the first DFS band.

20. The wireless device of claim 14, wherein the first data further comprises a channel identifier and information about a bandwidth of the channel associated with the respective radar event, wherein the processor is further to:

prior to determining the second score, filter out a first portion of the first data corresponding to radar events outside a channel range corresponding to the first DFS channel using the respective channel identifier and the information about the respective bandwidth of the channel; and filter out a second portion of the first data corresponding to historical radar events outside a channel range corresponding to the second DFS channel before determining the third score for the second DFS channel.

* * * * *